Figure 1:
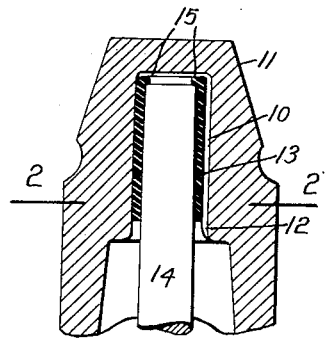

March 27, 1951 W. LARYMORE 2,546,312
DEAD END COUPLING
Filed April 22, 1947

Inventor
W. Larymore
By Glascock Downing Keeble
Attys

UNITED STATES PATENT OFFICE 2,546,312

DEAD-END COUPLING

William Larymore, Drummoyne, near Sydney, New South Wales, Australia, assignor to Keeseal Pty. Limited, Mascot, near Sydney, New South Wales, Australia, a company of New South Wales, Australia Application April 22, 1947, Serial No. 743,219
In Australia May 22, 1946

8 Claims. (Cl. 287—85)

This invention relates to those couplings wherein a rubber or like resilient sleeve or ring compressed between the male and female members constitutes the holding means whereby said members are coupled together.

Hitherto couplings of this type have not been adaptable for securing the rod (male member) in the dead end socket (female member) of a ceramic or like insulator whereby the insulator is mounted on a support. One reason such couplings have not been adaptable for such purpose is that the rubber or like resilient sleeve or ring mounted in the socket or on the rod prevents the escape of air from the socket during the insertion of the rod into the socket. Air entrained in the socket is compressed by the rod which functions like a piston and this compressed air prevents the making of a completely effective coupling. It is not always practicable or desirable to provide vents through the body of the insulator for the escape of air from the dead end socket. Consequently in these cases other and generally more costly coupling means have been employed.

This invention has been devised to provide a simple and effective construction whereby couplings of the type described can be used for securing a rod in the dead end socket in an insulator including the venting of the socket during the coupling operation and the sealing of the vent after the coupling operation has been completed.

One advantage arising from the invention is that it enables a metal or wood rod to be quickly and easily and permanently secured in a comparatively fragile insulator with less likelihood of fracturing the insulator than with other coupling means employed hitherto. Another advantage is that the resilient sleeve can be made of dielectric material and it constitutes an additional insulation between the rod and the insulator.

According to this invention the surface of that part of the rod which is to enter the socket or the surface of the wall of the socket is grooved longitudinally, or a straight or a sinuous groove, for such distance as is necessary is provided to provide a duct or vent providing communication between the interior of the dead end socket and the atmosphere. The width and depth of the groove is so proportioned that the sleeve straddles the groove during the connecting operation and air in the end of the socket is allowed to escape as it is displaced by the rod. Sustained compression of the resilient sleeve between the wall of the socket and the rod causes the sleeve ultimately to fill the groove and thus seal the vent. Although it is preferred to provide a groove as stated above it is within the scope of this invention to provide a groove in the wall of the resilient sleeve in substitution therefor.

Figure 3:
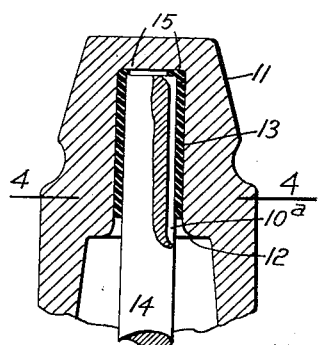
Figure 2:
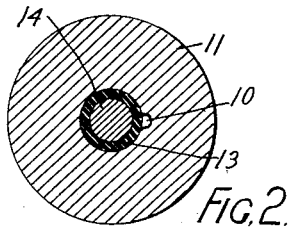
Figure 4:
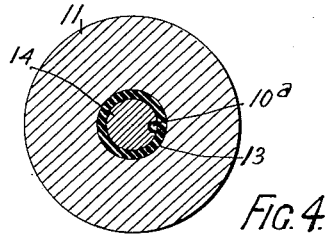
Figure 5:
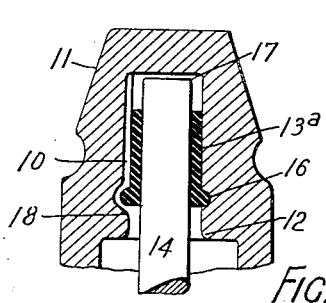
Figure 6:
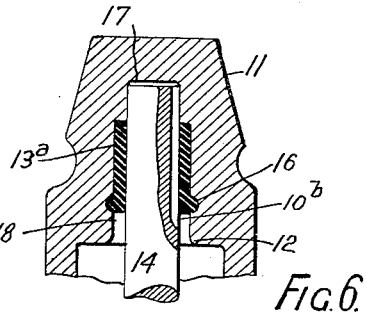
Figure 7:
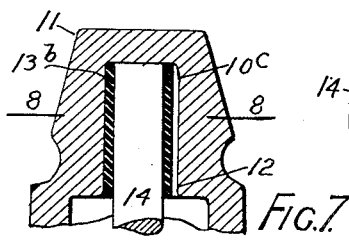
Figure 8:
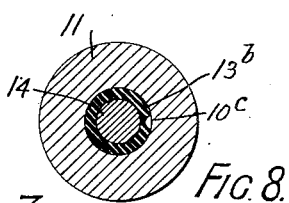

Several embodiments of the invention are illustrated in the annexed drawings wherein Fig. 1 is a fragmentary sectional elevation of a ceramic or like insulator with a part of the rod in elevation and showing the groove formed in the socket; Fig. 2 is a section on lines 2—2 of Fig. 1; Fig. 3 is a view similar to Fig. 1 showing the groove formed in the rod; Fig. 4 is a section on lines 4—4 of Fig. 3; Figs. 5 and 6 are views similar to Figs. 1 and 3 respectively showing a modification of the socket; Figs. 7 and 8 are views similar to Figs. 1 and 2 showing how the groove is formed in the resilient sleeve.

The parts are so proportioned that the rubber or like resilient sleeve before being compressed between the wall of the socket and the rod should have a wall thickness exceeding half but not exceeding twice the differential between the socket and the rod. Preferably the wall thickness of the sleeve is equal to the differential between the socket and the rod.

In Figs. 1 and 2 the groove 10 is formed in the socket wall of the insulator 11. The socket is made with a slight bell mouth as indicated at 12. In this construction the sleeve 13 is first mounted on the rod 14. The sleeve is of such diameter that it has to be stretched to fit on the rod and it clings to the rod. In mounting the sleeve on the rod it is provided that the end of the sleeve overlaps the end of the rod and owing to the reduced diameter of the sleeve its end turns inwardly as indicated at 15. This facilitates the making of the coupling. The operation of inserting the rod and sleeve in the socket is facilitated by first coating the external wall of the sleeve with a lubricant. The lubricant is quickly dissipated by extrusion and then it will be found that the rod is secure in the socket. In a short period of time the sleeve will fill the groove thereby further consolidating the rod in the socket.

Referring to Figs. 3 and 4 it will be seen that the groove 10a is formed in the rod 14. In all other respects the parts are identical to those described with reference to Figs. 1 and 2 and the same operations are employed in making the coupling.

In Fig. 5 a circular recess 16 is formed in the socket wall adjacent the mouth thereof and the groove 10 is also made in the recess. In all other respects the parts are identical to those described previously and the same references are used to depict them. However in this construction the sleeve 13a is of larger diameter than the sleeve 13. It is made to fit the wall of the socket and the end of the rod 14 is rounded as indicated at 17 to facilitate its entry into the sleeve. In this case the end of the rod or the internal wall of the sleeve is lubricated. When the rod is inserted it forces the outer end of the sleeve into the recess 16 and the sleeve is held thereby in the operation of making the coupling. In this construction the outer edge 18 of the recess 16 is slightly smaller in diameter than the bore of the socket. This reduced part constitutes an additional check against the withdrawal of the rod 14. Any tendency for the rod to pull out of the socket causes the sleeve 13a to wedge against the edge 18 and consequently against the rod 14.

The construction shown in Fig. 6 follows that shown in Fig. 5 with the exception that the groove 10b is formed in the rod 14 as in Figs. 3 and 4. The method of making the coupling is the same as that described with reference to Fig. 5.

In Figs. 7 and 8 the sleeve 13b can be made to fit the rod 14 or the wall of the socket. The groove 10c is formed in the sleeve 13b.

It will be appreciated that a sleeve such as 13a or 13b when made to fit a socket such as that shown in Fig. 7 would be of such diameter and length as to project outwardly from the socket prior to the insertion of the male member 14 in order to provide a flared entry for the male member.

Although this invention has been described with particular reference to the securing of a rod in the dead end socket of a ceramic or like insulator the invention is not necessarily confined to such insulators.

I claim:

1. A dead end socket coupling consisting of a male member, a female member terminating in a dead end and constituting a socket and a resilient sleeve member interposed and compressed between the female member and the male member; an air vent being formed in the surface of one of said members intermediate said sleeve member and one of the other members and connecting the dead end of said female member with the atmosphere.

2. A dead end socket coupling consisting of a male member, a female member terminating in a dead end and constituting a socket and a resilient sleeve member interposed and compressed between the female member and the male member; one of said members having a groove intermediate said sleeve member and one of the other members to constitute an air vent between the dead end of said socket and atmosphere.

3. A dead end socket coupling as claimed in claim 2 wherein the groove is formed in the male member.

4. A dead end socket coupling as claimed in claim 2 wherein the groove is formed in the female member.

5. A dead end socket coupling as claimed in claim 2 wherein the groove is formed in the resilient sleeve member.

6. A dead end socket coupling consisting of a male member and a female member terminating in a dead end and constituting a socket, one of said members having a longitudinal groove therein to constitute an air vent between the dead end of said socket and atmosphere; a resilient sleeve smaller in diameter than the male member and stretched and mounted on said male member with the end of said sleeve overlapping and turned in on said male member; said sleeve being of such thickness that it is compressed in the operation of inserting the male member in the female member.

7. A dead end socket coupling consisting of a male member and a female member terminating in a dead end and constituting a socket, one of said members having a longitudinal groove therein to constitute an air vent between the dead end of said socket and atmosphere; said female member having a circular recess in the wall adjacent the mouth thereof, the outer edge of said recess being of smaller diameter than the bore of the female member; a resilient sleeve disposed within the female member; said sleeve being of such thickness that it is compressed in the operation of inserting the male member and the outer end of said sleeve is gripped between the circular recess and the male member.

8. A dead end socket coupling consisting of a male member and a female member terminating in a dead end and constituting a socket and a resilient sleeve interposed within and compressed between the wall of the female member and the male member; an air vent formed in one of said members connecting the dead end of said socket with the atmosphere characterised in that said resilient sleeve is of such diameter and length relative to the socket as to project outwardly therefrom prior to the insertion of the male member to provide a flared entry facilitating entering of the male member into said sleeve and socket.

WILLIAM LARYMORE.

REFERENCES CITED

The following references are of record in the file of this patent:

FOREIGN PATENTS

| Number | Country | Date |
| --- | --- | --- |
| 122,355 | Great Britain | Jan. 23, 1919 |
| 223,300 | Great Britain | Oct. 17, 1924 |